United States Patent

[11] 3,545,325

[72] Inventor Joseph R. Camasta
Covina, California

[21] Appl. No. 804,056
[22] Filed Feb. 28, 1969
[45] Patented Dec. 8, 1970

[73] Assignee Aerojet-General Corporation
El Monte, California
a corporation of Ohio

[54] CUTTING APPARATUS
14 Claims, 11 Drawing Figs.

[52] U.S. Cl. .......... 83/412, 30/304; 83/10, 83/11, 83/36, 83/521, 83/651, 125/12
[51] Int. Cl. .......... B26d 7/02
[50] Field of Search .......... 83/7, 10, 11, 36, 412, 414, 651, 521; 30/304; 125/12, 16, 17, 18, 21

[56] References Cited

UNITED STATES PATENTS

| | | | |
|---|---|---|---|
| 2,120,375 | 6/1938 | Shaver et al. | 30/304X |
| 2,372,025 | 3/1945 | Smith | 125/12 |
| 2,381,993 | 8/1945 | Baker | 125/12 |
| 2,831,476 | 4/1958 | Wilson et al. | 125/12 |
| 3,155,087 | 11/1964 | Dreyfus | 125/21 |
| 3,222,963 | 12/1965 | Nabiullin et al. | 83/11X |
| 3,326,071 | 6/1967 | Bushman et al. | 83/36X |
| 3,435,815 | 4/1969 | Forcier | 125/16 |

*Primary Examiner*—William S. Lawson
*Attorneys*—Edward O. Ansell and D. Gordon Angus

ABSTRACT: Cutting apparatus according to the present disclosure comprises a blade pack having a plurality of cutting blades mounted to a frame. A wafer support is supported by said frame for supporting a wafer, and adjustment means provided for adjusting the position of the wafer to the apparatus. Means is provided for moving the wafer support between a first position wherein a wafer supported thereon is in abutment with the blades and a second position wherein the wafer is spaced from the blade pack. Drive means is provided for moving the wafer support in a direction parallel to the cutting blades.

INVENTOR.
JOSEPH R. CAMASTA
BY
D. Gordon Angus
ATTORNEY

INVENTOR.
JOSEPH R. CAMASTA
BY
D. Gordon Angus
ATTORNEY

CUTTING APPARATUS

This invention relates to apparatus for cutting thin film wafers into thin film chip devices.

Thin film chip devices are ordinarily formed by constructing a thin film wafer corresponding to a plurality of such chip devices and thereafter cutting or breaking the wafer into a plurality of individual chips, or dice. Ordinarily, the wafers are separated into chips by the so-called "scribe and break" method which comprises scribing the wafer along predetermined lines and thereafter breaking the wafer along such lines to form the chips. The scribe and break method, however, often produces chips having rough or irregular edges and broken corners. These broken edges, broken corners, and other imperfections in the chip device could affect the operation of subsequent handling operations of the chip devices.

It is an object of the present invention to provide cutting apparatus for cutting wafers into chip devices.

Another object of the present invention is to provide cutting apparatus for accurately cutting wafers along prescribed lines, which lines are accurately ascertainable in relationship to the cutting apparatus.

Another object of the present invention is to provide apparatus for handling thin film wafers wherein the wafers may be cut into chip devices.

According to the present invention cutting apparatus comprises a blade pack having a plurality of cutting blades spaced apart by a precisely determined incremental distance, and a wafer support mounted to a frame for moving a wafer along direction of the blades of the pack. The wafer support includes alignment means for locating the position of the wafer. The wafer support is capable of assuming either of two positions relative to the blade pack, one position being against the blade pack so that the wafer mounted thereon can be cut, and the other position being away from the pack so that the wafer can be examined.

According to an optional and desirable feature of the present invention, microscopic means is provided for examining the wafer when in its second position.

According to another optional and desirable feature of the present invention, motive means is provided for moving the wafer support parallel to the blades so as to cut the wafer.

The above and other features of this invention will be more fully understood from the following detailed description and the accompanying drawings, in which.

Figure 1:
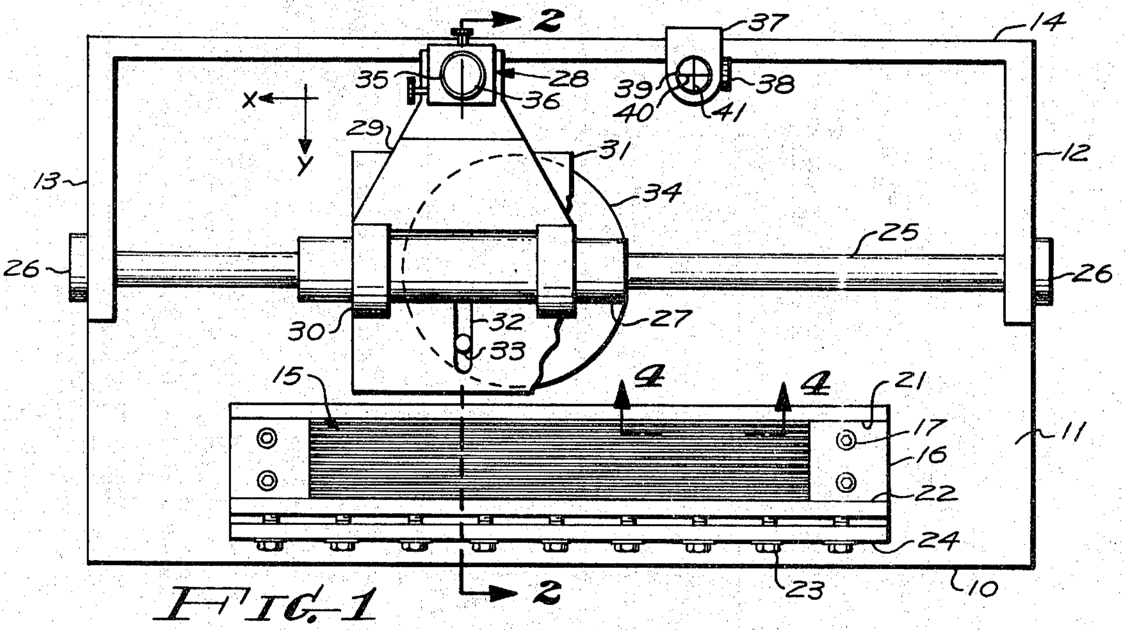
FIG. 1 is a planar top view of cutting apparatus in accordance with the presently preferred embodiment of the present invention.

Referring to the drawings, and particularly to FIGS. 1—4, there is illustrated cutting apparatus in accordance with the present invention. The cutting apparatus comprises a cutting frame 10 having a bottom wall 11, side walls 12 and 13, and back 14. Blade pack 15 is supported by bottom wall 11 and comprises a frame 16 mounted to frame 10 by means of suitable threaded fasteners 17 such as bolts. Frame 16 supports a plurality of alternately spaced saw blades 18 and spacers 19, thereby leaving a space $h$ between the top of saw blades 18 and the top of spacers 19 and between adjacent saw blades. Each spacer 19 is accurately sized so that the distance $d$ between adjacent saw blades 18 is accurately determined. Saw blades 18 are coated with an abrasive slurry 20 of oil or cutting fluid containing fine particulate matter, such as alumina dust which is about 3 microns fine.

The alternately disposed saw blades 18 and spacers 19 are sandwiched between wall 21 of frame 16 and plate 22, respectively. Threaded fasteners 23 are fastened to wall 24 frame 16 so as to bear against an opposite side of plate 22 thereby compressing, or wedging, the saw blades and spacers between plate 22 and wall 21.

Shaft 25 is mounted by means of fasteners 26 to opposite side walls 12 and 13 of frame 10. Wafer support 28 is supported at the outboard end of lever arm 29 which is journaled to supports 30 for rotation about the axis of shaft 25. Supports 30 are also journaled by means of journals 27 to shaft 25 for movement along the shaft. Plate 31 is mounted to supports 30 and includes a slot 32 adapted to engage cam 33 of cam wheel 34. Slot 32 is an elongated slot disposed substantially perpendicular to the axis of shaft 25. Shaft 45 (FIG. 2) is connected to cam wheel 34 and is driven about its axis to rotate the cam wheel.

Wafer support 28 includes a wafer receptacle 35 adapted to support a wafer, such as wafer 36. A suitable viewer, such as microscope 37, is mounted to wall 14 of frame 10 and preferably includes adjustment means 38 for adjusting the focus of the microscope and a viewer 39 containing cross hairs 40 and 41.

Figure 5:
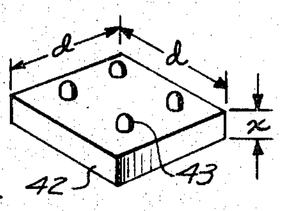
FIG. 5 is a perspective bottom view of a flip chip device cut by apparatus in accordance with the present invention.

For the purposes of illustration, the operation of the cutting apparatus will be described in connection with the cutting of wafer 36 into a plurality of flip chips 42 as illustrated in FIG. 5.

Chip 42, illustrated in FIG. 5, has a substantially square shape having a length and width $d$ and a thickness $x$. A plurality of bump contacts 43 is disposed on one surface of chip 42 and act as contacts for connecting chip 42 to other electrical circuits or devices. By way of example, dimension $d$ may be approximately between 0.02 and 0.05 inch, and dimension $x$ may be 0.006 to 0.010 inch. The height of each bump 43 may be as much as 0.001 to 0.003 inch and have a diameter of between about 0.003 to 0.007 inch. The foregoing dimensions are given by way of example and should not be construed as limiting on this invention.

In operation, blade pack 15 is positioned on frame 10 so that the saw blades are exactly parallel to the axis of shaft 25. The saw pack selected is such that the distance $d$ between adjacent saw blades is equal to the width of each chip to be formed and the space $h$ between the top of the saw blades and the top of spacers 19 exceeds the combined thickness $x$ of the chip and the height of the bump contacts. By way of example, dimension $h$ may be between 0.04 and 0.08 inch. The saw blades are coated with abrasive slurry 20, as heretofore described.

Figures 2, 3, 4:
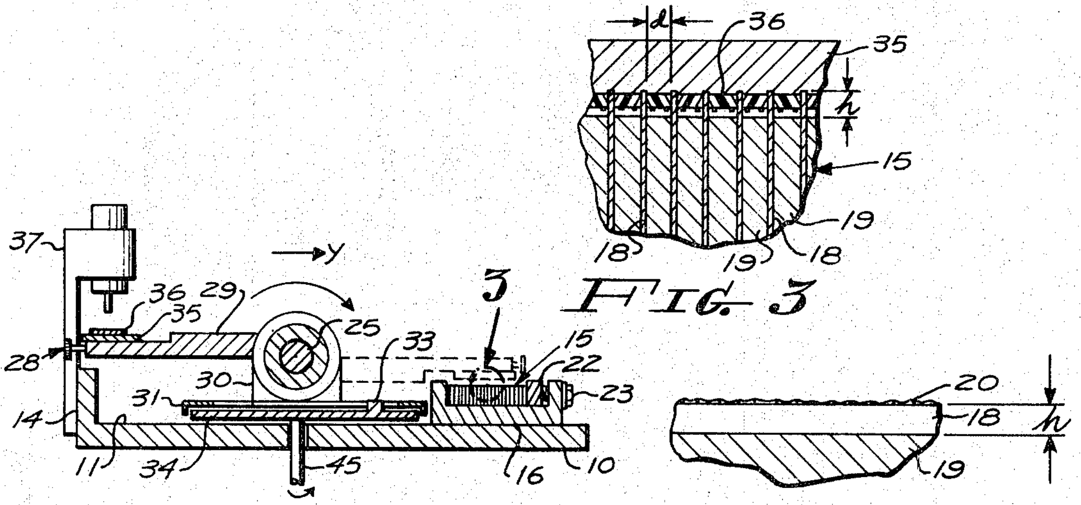
FIG. 2 is a section view of the apparatus illustrated in FIG. 1 taken along line 2–2 in FIG. 1.
FIG. 3 is an enlarged section view of a portion of the saw pack taken at circle 3 in FIG. 2.
FIG. 4 is a section view of another portion of the saw pack taken along line 4–4 in FIG. 1.
Figure 6:
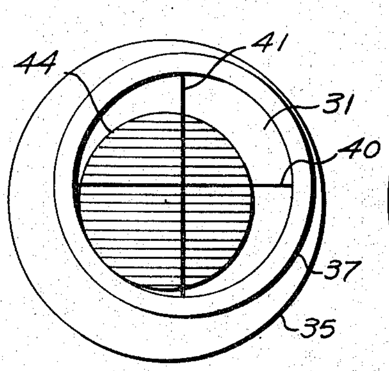
FIG. 6 is a view of a cut on a test wafer taken through a microscope having cross hairs in accordance with the present invention.

A test wafer 44 (FIG. 6) is positioned on wafer receptacle 35 in the position of wafer 36 in FIGS. 1 and 2, and lever arm 29 is rotated about the axis of shaft 25 to the position illustrated in dashed lines in FIG. 2 so that test wafer 44 contacts blade pack 15. Shaft 45 of cam wheel 34 is then rotated about its axis by means (not shown) thereby imparting rotational or circular motion to cam 33. As cam 33 rotates, slot 32, engaged to cam 33, causes plate 31 to move along the axis of shaft 25 thereby causing arm 29 to move parallel to the axis of shaft 25. Hence, as arm 29 reciprocates along the axis shaft 25, test wafer 44 is grinded in the vicinity of the individual saw blades 18 of the blade pack by virtue of the abrasive material coating the blades. After several reciprocal motions of lever arm 29, the cutting is stopped and lever arm 29 is rotated back to the position as illustrated in FIG. 1. The test wafer 44 is then brought into position under microscope 37 and cross hair 40 is aligned with one of the cuts on the test wafer 44 as illustrated in FIG. 6.

Figure 7:
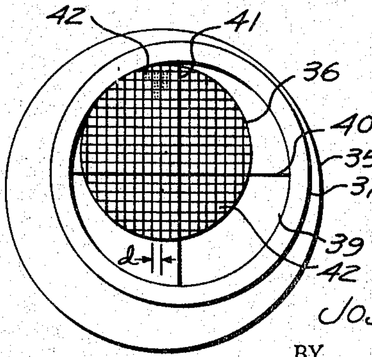
FIG. 7 is a view through the microscope as in FIG. 6 of a thin film wafer positioned to be cut into chip devices.

Test wafer 44 is then removed from wafer receptacle 35 and is replaced by thin film wafer 36 which is the wafer to be cut into the chips illustrated in FIG. 5. A close examination of wafer 36 under microscope 37 (FIG. 7) will reveal that a plurality of bumps are present, such as bumps 43 (FIG. 5), and when viewing such bumps under a microscope, a desired line of cut can be located between parallel rows of bumps. Since the blade pack has been preselected so as to cut along a plurality of lines spaced apart by a prescribed distance, this distance being determined by the wafer construction, the operator can determine that by aligning one desired cut with cross hair 40 previously located with an actual cut, the other cuts formed by the saw pack will cut the wafer along the other desired lines.

Hence, an imaginary line of cut is located on wafer 36 and is superpositioned on cross hair 40. Wafer 36 is fixed to wafer receptacle 35 which in turn is positioned so that cross hair 40 is positioned over a desired cut. Lever arm 29 is rotated about the axis of shaft 25 to the position illustrated in dashed lines in FIG. 2 so that wafer 36 is in contact with saw pack 15. Motion imparted to shaft 45 is lever arm 29 to reciprocate along the axis of shaft 25, thereby cutting wafer 36 along the preselected lines.

The wafer may then be moved back to position illustrated in FIG. 1 and rotated 90°, a new cut line can be located and cut by the apparatus. Specifically, the wafer can be positioned on the wafer support so that a desired line of cut 90° from the first cut is coincident with the cross hair 40 of the microscope so that the new cut can be made. It should be noted that once the location of the saw blades with respect to the microscope cross hairs has been determined, it is not necessary to use a test wafer to relocate the relative position of the microscope and the blades until either the saw blades or the microscope has been moved.

Figures 8, 9, 10:
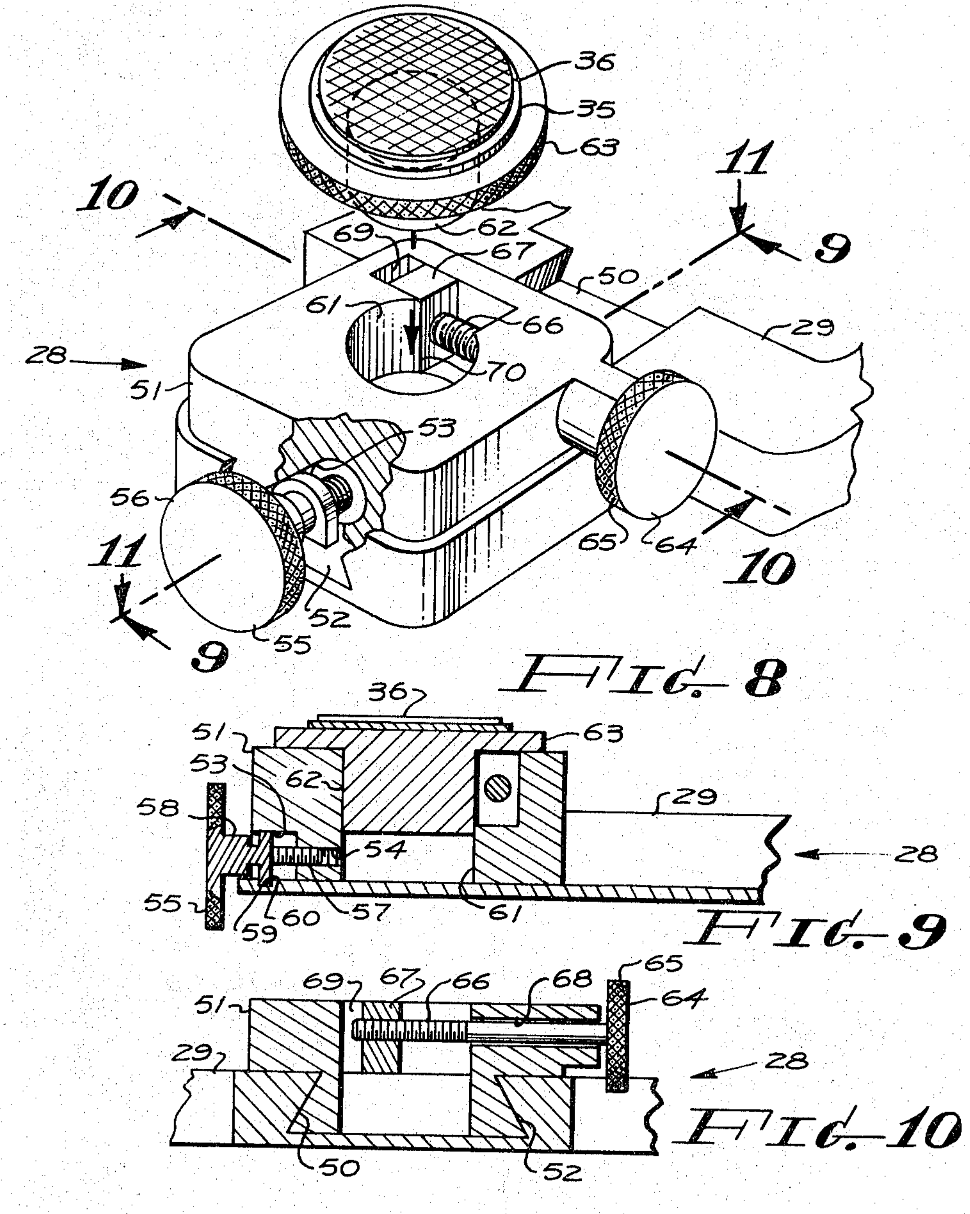
FIG. 8 is a perspective, exploded view, partly in a cutaway cross section, of a wafer positioning mechanism for use in the apparatus illustrated in FIGS. 1 and 2.
FIG. 9 is a section view taken along line 9–9 in FIG. 8.
FIG. 10 is a section view taken along line 10–10 in FIG 8.
Figure 11:
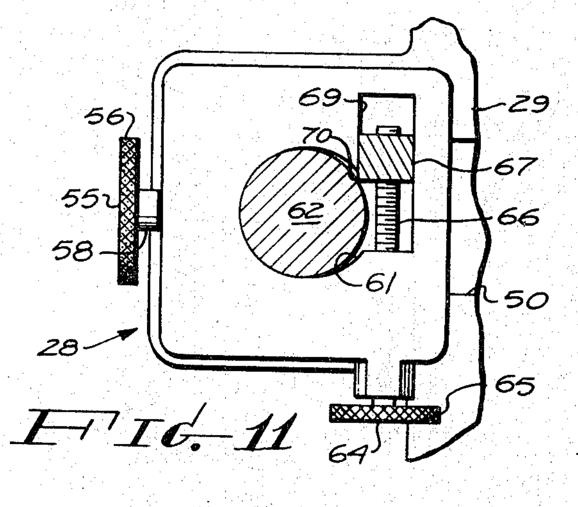
FIG. 11 is a section view taken along line 11–11 in FIG. 8.

Wafer support 28 is illustrated in greater detail in FIGS. 8 to 11, inclusive, and includes dovetail slot 50 having inclined dovetail walls in lever arm 29. Wafer alignment housing 51 includes a dovetail portion 52 slidably engaged to dovetail slot 50. Housing 51 includes bore 53 and concentric threaded portion 54 (FIG. 9). Turnscrew 55 includes a serrated knob 56, and threaded portion 57 threadably engaged to threaded portion 54 of housing 51. The shank of screw 55 includes a first annular shoulder 58 adapted to contact the lower surface of dovetail slot 50. A second shoulder 59 is engaged within slot 60 in the lower surface of dovetail slot 50 in lever arm 29. Shoulder 59 also contacts the upper portion of bore 53.

Cylindrical bore 61 is provided through housing 51 and is adapted to receive cylindrical shaft 62 of disc 63. As illustrated in the drawings, wafer receptacle 35 is fixly attached to the upper surface of disc 63 and may consist of a raised adherent surface on disc 63 for receiving wafer 36. Preferably, the side of disc 63 is serrated so as to enable manual rotation of the disc about the axis of shaft 62.

Turnscrew 64 includes serrated knob 65 and a threaded portion 66 which is threadably engaged to nut 67. As illustrated particularly in FIG. 10, threaded portion 66 extends through cylindrical bore 68 in housing 51. Nut 67 is disposed within slot 69 to prevent relative rotation of the nut, and slot 69 is open to one side portion of bore 61. Edge 70 of nut 67 extends into bore 61.

To use the alignment mechanism illustrated in FIGS. 8 through 11, inclusive, a wafer 36 to be cut is attached to receptacle 35 by suitable bonding means (not shown). Cylindrical shaft 62 is inserted into bore 61, and lever arm 29 is moved to bring wafer 36 into position below microscope 37. Initially, turnscrew 64 is loosened so as to make rotation of shaft 62 within bore 61. Disc 63 is rotated about its axis until the desired line of cut is brought parallel to a cross hair 40 of the microscope. Turnscrew 64 is then tightened to draw nut 67 through slot 69 until edge 70 clamps against shaft 62, thereby wedging the shaft to prevent it from rotating. Screw 55 is then rotated about its axis to relatively move housing 51 with respect to lever arm 29. In this respect, screw 55 is fixly located with respect to lever arm 29 by virtue of shoulder 59 being engaged to slot 60 in bore 53. Hence, the threaded portion 57 reacts upon housing 51 to move housing 51 in the Y direction as illustrated in the drawings. Since the lead of the threaded portions 57 and 54 is relatively fine, a fine adjustment of the Y position of housing 51 may be achieved. Hence, the location of wafer 36 on the radius of arm 29 about shaft 25 may be accurately located. Thus, when the lever arm is in the position illustrated in dashed lines in FIG. 2 (so that wafer 36 can be cut by blade pack 15) the position of wafer 36 in the Y direction is aligned with the blades of the blade part.

It is preferred that during all cutting operations the wafer being cut is bonded or otherwise adhered to the wafer receptacle 35 so that as the chips are cut they do not fall free of the support. Hence, the chips can be removed together and in bulk for subsequent classifying operations. In this respect, wafer 36 can be bonded to the wafer receptacle during its formation, which wafer receptacle can be clamped into wafer support 28. Upon completion of the cutting operation, the wafer chips can be removed from the substrate.

The present invention thus provides cutting apparatus for cutting thin film wafers into a plurality of chip devices to affectuate smoothly cut edges of such chip so as to enable the chip to be efficiently handled in subsequent operations. Apparatus according to the present invention is effective in use and is easily operated in production techniques.

The cutting apparatus according to the present invention is capable of cutting chip devices from a wafer so that the chip devices have substantially smooth edge surfaces and uniform dimensions. The present invention substantially eliminates the rough edges, broken corners, and varying dimensions heretofore associated with chip devices formed by the scribe and break method.

Saw blades 18 have a thickness as small as practical considering such factors as trueness, strength of the blades, and minimization of the thickness of each cut. Typically, the blades will each have a thickness of about 0.002 to 0.004 inch, although this dimension may be varied. The spacers 19 separating the blades are accurately sized for the particular size of chip being formed by the cutting operation. Furthermore, by tightly sandwiching the stack of alternate blades and spacers in frame 16, most lateral forces are supported by the frame 16 and the trueness of the blades may be maintained.

If it is desirable to change the blade pack so as to cut different sizes of chips, the blade pack may be disassembled and differently sized spacers may be placed between the blades, thereby obtaining a different dimension *d* between the saw blades and for each side of the chip.

If a blade should break or become otherwise unusable, it is not necessary to discard the entire blade pack, but instead the blade pack may be disassembled and the unusable blade may be replaced. The pack may then be reassembled with the new blade in place.

This invention is not to be limited by the embodiment shown in the drawings nor described in description, which is given by way of example and not of limitation, but only in accordance with the scope of the appended claims.

I claim:

1. Cutting apparatus for cutting an object comprising: a frame; a blade pack mounted to said frame, said blade pack comprising a plurality of cutting blades disposed substantially parallel to each other in predetermined spaced relation; support means for supporting an object; lever means mounted to said frame for supporting said support means; a shaft mounted to said frame parallel to the said cutting blades; first journal means journaling said lever means to said shaft so that said lever means may be rotated about said shaft between a first position wherein said object is contacting said blade pack and a second position wherein said object is spaced from said blade pack; second journal means journaling said lever means to said shaft so that said lever means may be moved along said shaft, said support means including first adjustment means for adjusting the rotational position of the object about an axis perpendicular to the alignment of said cutting blades, and second adjustment means for adjusting the position of the object in the direction perpendicular to said axis.

2. Apparatus according to claim 1 wherein said second adjustment means selectively adjusts the radius of rotation of the object about said shaft.

3. Apparatus according to claim 1 further including drive means for moving said support means in a direction parallel to said cutting blades.

4. Apparatus according to claim 3 wherein said drive means comprises a cam adapted to be driven in a circular path, a support plate mounted to said lever means, an elongated slot in said support plate and engaging said cam, said elongated slot being disposed substantially perpendicular to said shaft.

5. Apparatus according to claim 1 wherein said support means includes a housing and said first adjustment means comprises a plate for supporting said object and having a shaft defining said axis, said housing having a bore receiving said shaft, and clamp means for clamping against said shaft in said bore to prevent relative rotation of said shaft in said bore, whereby said plate may be selectively rotated to adjust the position of said object, and said clamp means can clamp against said shaft to fix the rotational position of said object.

6. Apparatus according to claim 5 wherein said second adjustment means comprises a slot in said lever means aligned parallel to the length of said lever means, a slide on said housing slidably engaged to said slot, and means for selectively fixing the position of said slide in said slot.

7. Apparatus according to claim 6 further including a shaft mounted to said frame parallel to said cutting blades, first journal means journaling said lever means to said shaft so that said lever means may be rotated about said shaft between said first and second positions, and second journal means journaling said lever means to said shaft so that said lever means may be moved along said shaft.

8. Apparatus according to claim 7 wherein said second adjustment means selectively adjusts the radius of rotation of the object about said shaft.

9. Cutting apparatus for cutting an object comprising: a frame; a blade pack mounted to said frame, said blade pack comprising a plurality of cutting blades disposed substantially parallel to each other in predetermined spaced relation; support means for supporting an object; and lever means mounted to said frame for supporting said support means; said lever means being capable of moving said support means between a first position wherein said object is contacting said blade pack and a second position wherein said object is a spaced from said blade pack, said support means including first adjustment means for adjusting the rotational position of the object about an axis perpendicular to the alignment of said cutting blades, and second adjustment means for adjusting the position of the object in a direction perpendicular to said axis, said second adjustment means comprising a slot in said lever means aligned parallel to the length of said lever means, a slide on said support means slidably engaged to said slot, and means for selectively fixing the position of said slide in said slot.

10. Cutting apparatus for cutting an object comprising: a frame; a blade pack mounted to said frame, said blade pack comprising a plurality of cutting blades disposed substantially parallel to each other in predetermined spaced relation; support means for supporting an object; a lever arm mounted to said frame for supporting said support means, said lever arm being capable of moving said support means between a first position wherein said object is contacting said blade pack and a second position wherein said object is spaced from said blade pack; said support means including a housing mounted to said lever arm said housing having a bore disposed about an axis perpendicular to the alignment of said cutting blades, a plate for supporting said object and having a shaft, said bore receiving said shaft, and clamp means for clamping against said shaft in said bore to prevent relative rotation of said shaft in said bore, whereby said plate may be selectively rotated to adjust the rotational position of said object and said clamp means clamps against said shaft to fix the rotational position of said object, and second adjustment means for adjusting the position of the object in a direction perpendicular to said axis.

11. Apparatus according to claim 10 wherein said second adjustment means comprises a slot in said lever arm aligned parallel to the length of said lever arm, a slide on said housing slidably engaged to said slot, and means for selectively fixing the position of said slide in said slot.

12. Apparatus according to claim 11 further including a shaft mounted to said frame parallel to said cutting blades, first journal means journaling said lever arm to said shaft so that said lever arm may be rotated about said shaft between said first and second positions, and second journal means journaling said lever arm to said shaft so that said lever arm may be moved along said shaft.

13. Apparatus according to claim 12 wherein said second adjustment means selectively adjusts the radius of rotation of the object about said shaft.

14. Apparatus according to claim 1 wherein said second adjustment means comprises a slot in said lever means aligned parallel to the length of said lever means, a slide on said support means slidably engaged to said slot, and means for selectively fixing the position of said slide in said slot.